United States Patent [19]
Yu

[11] Patent Number: 5,790,055
[45] Date of Patent: Aug. 4, 1998

[54] METHOD FOR ENCODING CHINESE AND JAPANESE IDEOGRAPHIC CHARACTERS FOR COMPUTER ENTRY, RETRIEVAL AND PROCESSING

[76] Inventor: Cho Jen Yu, 77 Oxford, Irvine, Calif. 92715

[21] Appl. No.: 310,726

[22] Filed: Sep. 22, 1994

[51] Int. Cl.⁶ .................................................. H03K 17/94
[52] U.S. Cl. ............................ 341/28; 400/110; 707/535
[58] Field of Search ............................ 341/28, 22, 20; 364/419.09; 400/110; 707/535; 345/171

[56] References Cited

U.S. PATENT DOCUMENTS

| | | | |
|---|---|---|---|
| 4,872,196 | 10/1989 | Royer et al. | 341/28 |
| 4,920,492 | 4/1990 | Wang | 364/419.09 |
| 5,119,296 | 6/1992 | Zheng | 364/419.09 |
| 5,131,766 | 7/1992 | Wong | 400/110 |

*Primary Examiner*—Brain Zimmerman
*Assistant Examiner*—Andrew Hill

[57] ABSTRACT

This invention is for encoding of Chinese & Japanese ideographic characters which are digitized into a numeric format compatible for computer access and retrieval. Each Chinese & Japanese character is indexed by a numerical code. Each character is individually identified by an eight (8)-digit Geo-Stroke code, comprised of a four (4)-digit "FRAME" code and a four (4)-digit "ID" code. The coding method conforms to general writing habits, resulting in an input method both easy and convenient for an operator to learn and utilize. Each of the (10) Geostrokes used to input Chinese & Japanese character is assigned to a numeric digit (0-9). Each of the Geostrokes resembles one of the numeric digits available on the 10-key pad. By using this method both Chinese and Japanese ideographic character can be easily input and retrieved by using a 10-key design. By using this invention, both Chinese and Japanese computer users can now use one entry system to manipulate both languages and be completely compatible and interchangeable.

5 Claims, 16 Drawing Sheets

Geo-Stroke Coding Proceedure

1   Input The " Frame " code.

2   Dissect the character into their sub-blocks by stroke groups.

3   Index the character to the corresponding Geo-Block type.

4.   Input The " ID " code.

FIGURE 1

GEOSTROKE - DIGIT CORRELATION CHART AND STROKE DESCRIPTIONS

| | GEO-STROKES | STROKE FAMILIES | Keyboard Graphics | Stroke Description |
|---|---|---|---|---|
| 1 | ⎟ | ⎟ | 〇 1 | "VERTICAL" Stroke (Top-Down) |
| 2 | 一 | 一 | 二 2 | "HORIZONTAL" Stroke (L to R) |
| 3 | ⺄ | ⺀ ⺊ | 三 3 | "TICK" (L to R) "DOT" (L to R) |
| 4 | ⼃ | ノノノ一ノ | 四 4 | DOWNSTROKE (R to L) |
| 5 | ⼂ | ⼂ ⌒ ⼂ | 五 5 | DOWNSTROKE (L to R) |
| 6 | ㄴ | ㄴ ㄴ | 六 ⑥ 6 | "SPOON" (Rounded Angle) |
| 7 | 𠃍 人 | ⌐ ⫤ ㄴ ⌐ ⌐ ⊤ ⊥ ⊓ 人 人 入 ⼈ ㄴ ㄴ ⌐ ⼎ ⼷ 𠂉 𠂊 乁 ⺁ 丿 𠂎 | 七 7 | "CORNERS" "ANGLES" (Sharp Angles) |
| 8 | X | ㇉ 十 丰 才 ナ 七 X ㇒ | 八 ⑧ | "CROSS" (Intersecting strokes) |
| 9 | ⼁ | ⼁ ⼁ ⼂ ⼂ ⼂ ⼂ ⼂ ⼂ ⼂ ⼂ | 九 9 ⑨ | "HOOK" |
| 0 | 口 | 口 ヨ ㅂ 且 止 | ○ ▢ 〇 | "BOX" |

FIGURE 2

GEOBLOCK SAMPLES

| | |
|---|---|
| 1 | 弓 |
| 2 | 李　林　凶軍　匡旬　四田回 |
| 3 | 麻　留　負　椰　卧　通<br>柏招　胡維　同　鉅　陶　來夾　尚 |
| 4 | 貼跑　欺　罰　梭暖　濕　溜　閣<br>嶽　彎　尋　賣　似　街樹　岡<br>搬條　離　逼逡透　獨渴　高 |

GEOBLOCK SAMPLES

5

襄 捌衕 漬 樽 侃 履覆 閨

爽

哭甄 澀 轆 雛鄒 壽臺慶 雜 觸

6+

流 讓 獸 緇 續 酬 鱻

FIGURE 3
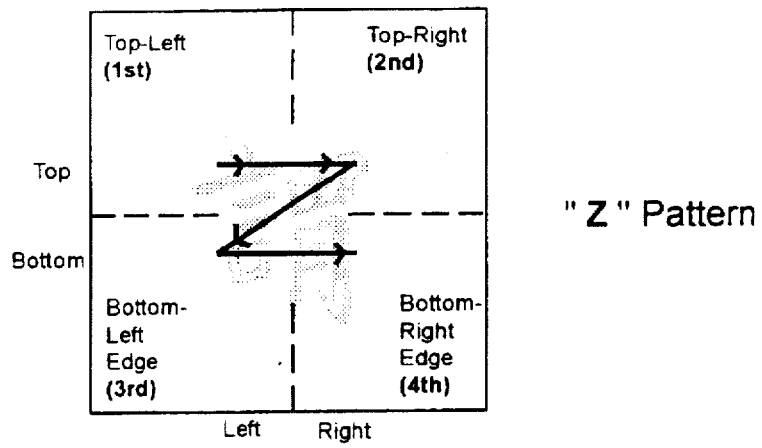
"Z" Pattern
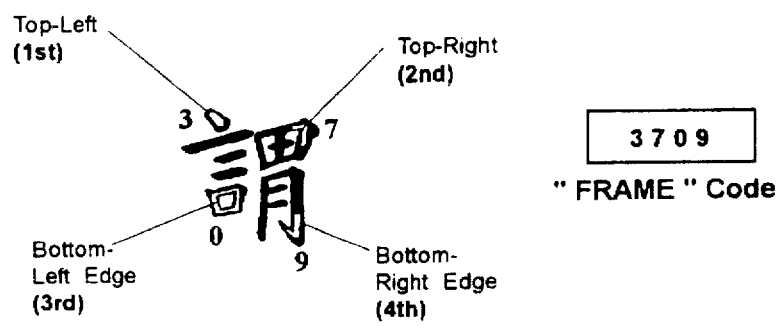
"FRAME" Code: 3 7 0 9
Examples
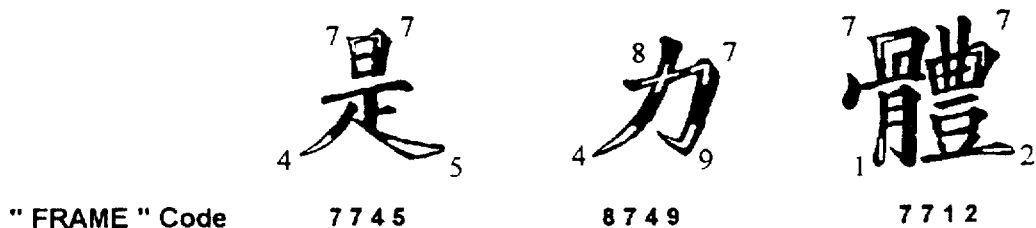
"FRAME" Code   7 7 4 5    8 7 4 9    7 7 1 2
"FRAME" Code   7 8 4 3

FIGURE 4
Geo-Stroke Coding Proceedure
1. Input The " Frame " code.
2. Dissect the character into their sub-blocks by stroke groups.
3. Index the character to the corresponding Geo-Block type.
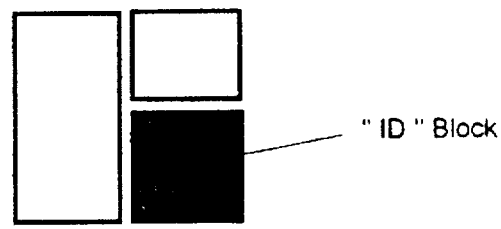
4. Input The " ID " code.
Geo-Stroke Code : 3 7 0 9 - 7 7 1 9  =  謂  Character Output FIGURE 5
| CHARACTER | "FRAME" Code | GEO-BLOCK TYPE | "ID" Code | GEOSTROKE CODE |
|---|---|---|---|---|
| 力 | 8749 | 1a  | 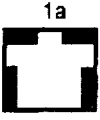 | 8749-8749 |
| 是 | 7745 | 2a  |  | 7745-2245 |
| 謂 | 3709 | 3a  |  | 3709-7719 |
| 體 | 7712 | 4a  |  | 7712-2222 |
| 續 | 7843 | 6e  |  | 7843-7777 |

Geo-Block Rules Examples:

FIGURE 7
Priority Rule 1 Examples
"FRAME" Code    3 3 4 3              8 8 4 3
Priority Rule 2 Examples
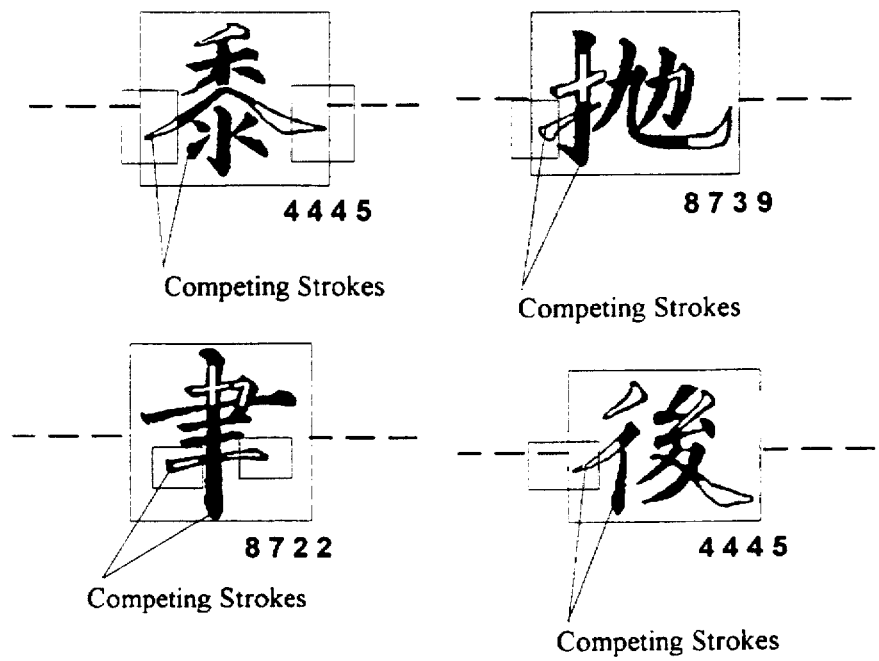
Priority Rule 3 Example
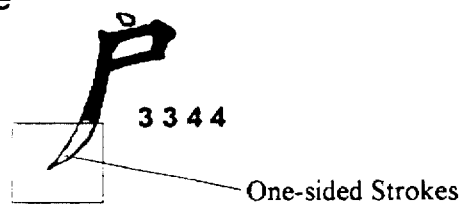

FIGURE 8
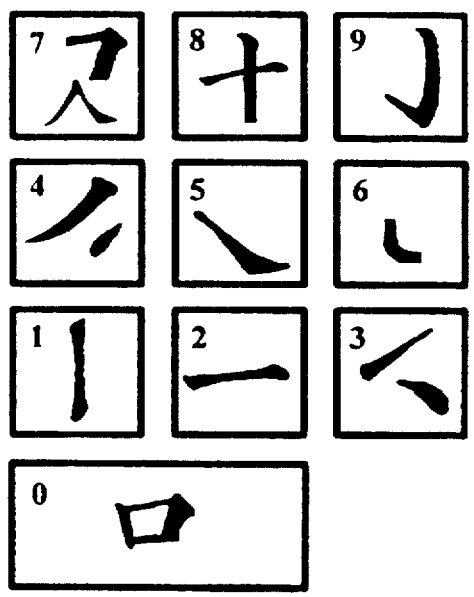
A
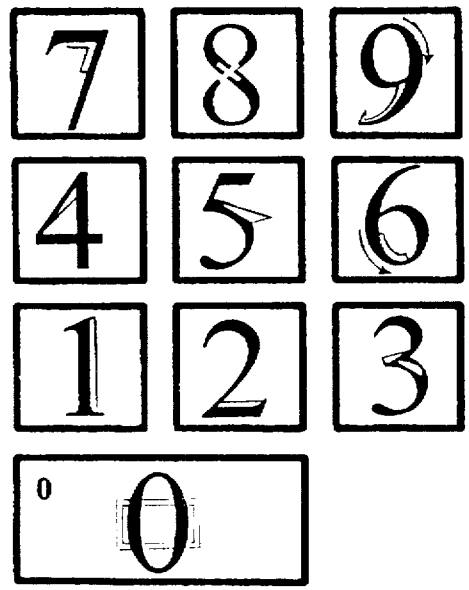
B
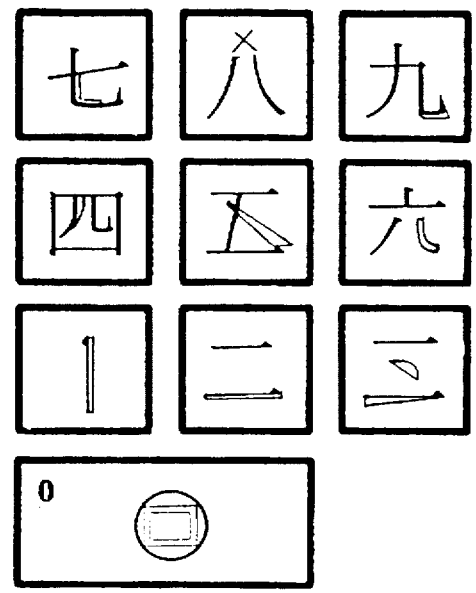
C

FLOW CHART

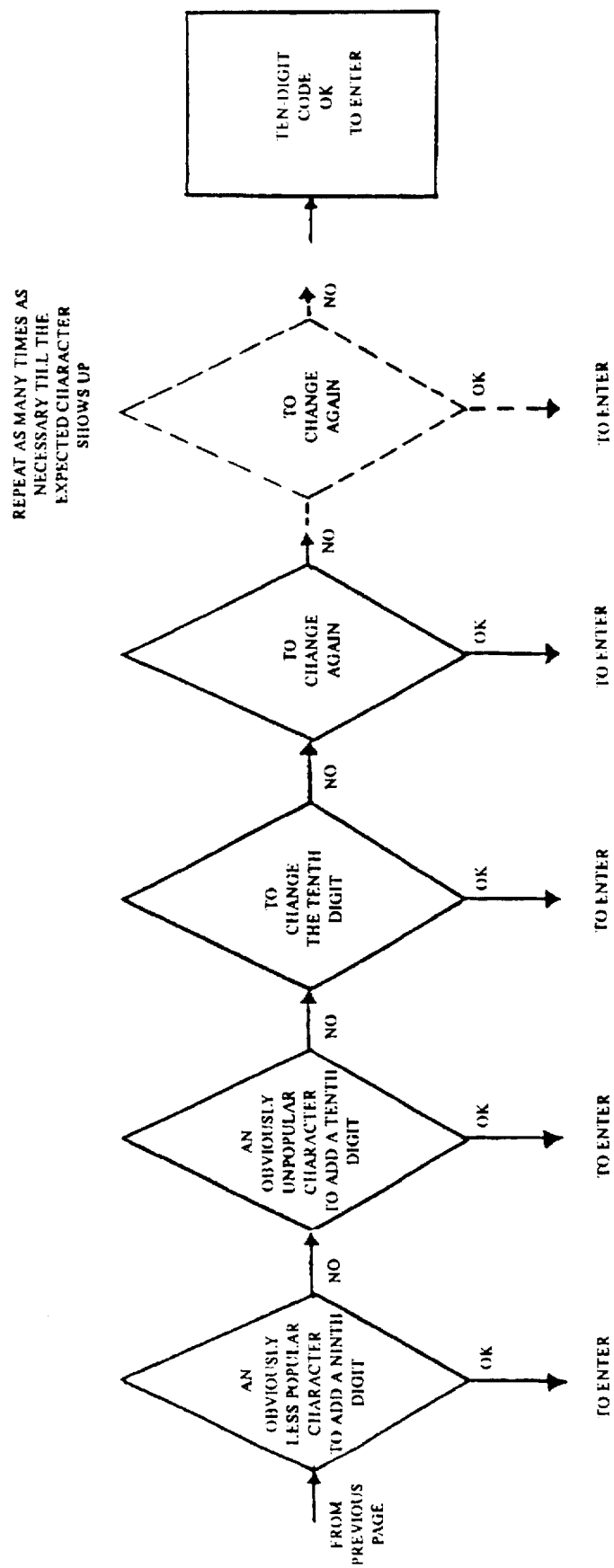
FLOW CHART

| | | | |
|---|---|---|---|
| 礙 27051262 | 幣 42197719 | 燦 47453445 | 徹 42453377 |
| 骯 73197749 | 斃 42492222 | 層 00473434 | 塵 33428020 |
| 襖 37458845 | 標 82432243 | 攙 87391262 | 襯 37493322 |
| 壩 82398822 | 錶 78358845 | 讒 37091262 | 稱 44427719 |
| 闔 77190000 | 弊 42792779 | 饞 77791262 | 懲 42433343 |
| 辦 33428749 | 葡 88790000 | 纏 73427745 | 遲 30553422 |
| 幫 88194777 | 補 33498319 | 懺 43497743 | 衝 42494422 |
| 寶 33432233 | 繞 77491262 | 償 44130000 | 醜 27797777 |
| 報 87257745 | 蠶 02377777 | 廠 33454242 | 齣 17790000 |

FIGURE 10

| | | | |
|---|---|---|---|
| 碍 27022222 | 币 44194419 | 灿 41471177 | 彻 47498899 |
| 航 73497749 | 毙 14492222 | 层 00472277 | 尘 43228822 |
| 袄 34454445 | 標 82432243 | 搀 87330049 | 衬 38492839 |
| 坝 87337743 | 表 88458845 | 谗 37930049 | 称 49434343 |
| 板 82457745 | 别 01491111 | 馋 77930049 | 惩 42433343 |
| 办 43438749 | 卜 13133333 | 缠 73327722 | 迟 30550045 |
| 帮 87197719 | 补 33431111 | 忏 44414411 | 冲 30310011 |
| 宝 33222222 | 才 88498849 | 偿 44172277 | 丑 27228888 |
| 报 87357745 | 蚕 44450037 | 厂 72447244 | 出 11771177 |

FIGURE 11

| ア | イ | ウ | エ | オ |
|---|---|---|---|---|
| 29442944 | 44114411 | 33443344 | 22222222 | 88498849 |
| カ | キ | ク | ケ | コ |
| 87498749 | 88358835 | 77447744 | 42444444 | 27272727 |
| サ | シ | ス | セ | ソ |
| 88148814 | 33333333 | 27432743 | 89628962 | 34444444 |
| タ | チ | ツ | テ | ト |
| 774477442 | 44448844 | 34443333 | 22442244 | 13133333 |
| ナ | ニ | ヌ | ネ | ノ |
| 884488441 | 22222222 | 27452745 | 33433343 | 44444444 |
| ハ | ヒ | フ | ヘ | ホ |
| 45454545 | 14621462 | 27442744 | 77357735 | 88438843 |
| マ | ミ | ム | メ | モ |
| 29772977 | 33553333 | 77777777 | 88448844 | 22622262 |
| ヤ | ユ | ヨ | ラ | リ |
| 89358935 | 27222722 | 27222722 | 22442744 | 11441144 |
| ル | レ | ロ | ワ | ン |
| 41491199 | 13991399 | 00000000 | 774477441 | 333333332 |
| ヲ | 子 | 井 | 工 |  |
| 27442744 | 29998899 | 88428842 | 29221122 |  |

FIGURE 12

| | | | | |
|---|---|---|---|---|
| あ 88098809 | い 15655555 | う 33992999 | え 33422742 | お 83393333 |
| か 85455555 | き 886288622 | く 44554455 | け 18748844 | こ 22626262 |
| さ 88628862 | し 11661166 | す 88448844 | せ 88728872 | そ 27622762 |
| た 82426262 | ち 88798879 | つ 29992999 | て 27662766 | と 14621462 |
| な 87407700 | に 12726262 | ぬ 89008900 | ね 89408940 | の 09090909 |
| は 18708800 | ひ 27652765 | ふ 33454343 | へ 77357735 | ほ 12702200 |
| ま 88008800 | み 24052405 | む 83063333 | め 89098909 | も 88668866 |
| や 89558955 | ゆ 19791979 | よ 12051205 | ら 33991999 | り 11741144 |
| る 27402740 | れ 89468946 | ろ 27792779 | わ 89498949 | ん 49464946 |
| ゐ 19721972 | を 886288621 | ゑ 27432743 | | |

GEOSTROKE - DIGIT CORRELATION CHART AND STROKE DESCRIPTIONS

| | GEO-STROKES | STROKE FAMILIES | Keyboard Graphics | Stroke Description |
|---|---|---|---|---|
| 1 | ( | ( | 1 | "VERTICAL" Stroke (Top-Down) |
| 2 | ⌣ | ⌣ | 2 | "HORIZONTAL" Stroke ( L to R ) |
| 3 | ↘ | ↘ ↗ | 3 | "TICK" ( L to R ) "DOT" ( L to R ) |
| 4 | J | J J ↙ | 4 | DOWNSTROKE ( R to L ) |
| 5 | ↘ | ↘ ↘ | 5 | DOWNSTROKE ( L to R ) |
| 6 | C | C ⌣ ⌒ ϲ | 6 | "SEMI CIRCLE" (Counter Clock-wise) |
| 7 | T | ʔ ⁄ ⊤ ∧ ↘ ⊤ ⊦  ⊤ ⊦ ⌐ ⊲ ⁄ ⊳ ⌐ | 7 | "CORNERS"  "ANGLES" ( Sharp Angles ) |
| 8 | X | ✶ ✷ X ⨯ + ✗ | 8 | "CROSS" ( Intercepting strokes ) |
| 9 | ⊃ | ⊃ ⌣ ⌒ ⌣ | 9 | "SEMI CIRCLE" (Clock-wise) |
| 0 | ♂ | ♂ ♂ ə ∮ ρ | O | "CIRCLE" |

METHOD FOR ENCODING CHINESE AND JAPANESE IDEOGRAPHIC CHARACTERS FOR COMPUTER ENTRY, RETRIEVAL AND PROCESSING

BACKGROUND DISCUSSION

In the past, primitive large mechanical typewriters were used for Chinese typesetting. These typewriters typically used multiple "Word Pallets" or trays, each of them consisting of thousands of individual characters from which one word at a time is selected. The process was extremely slow. The large number of characters involved in an ideogram-based language such as Chinese and Japanese makes the simple task of computer entry a major obstacle for the would-be Asian computer user. To communicate in written Chinese and Japanese with a moderate degree of proficiency, between 2000–9000 characters must be made available to the user. Chinese characters are very different from the relatively simple alphabetic systems of the western languages. It is because of this reason that the Western (101) keys standard computer keyboards have been difficult to adapt for input of these ideographic languages. It is necessary to computerize and increase the speed of Chinese & Japanese data processing. With this invention, fast and effective ideographic data processing can be achieved in accordance to traditional evolution of Chinese & Japanese languages.

SUMMARY OF INVENTION

The Geo-stroke is an invention by which a method is provided for the numeric input and retrieval of ideographic character from a storage device, such as a computer. The principal objective of the invention is to develop an advanced new method of converting Chinese & Japanese ideographic characters into numeric codes. The Geo-stroke system uses a basic eight (8)-digit coding scheme with the capacity to encode each and every Chinese & Japanese character with its own unique code. Another important objective of the invention is to design a simple and easy to learn input system which can be used by persons having only minimum knowledge of the language involved. As a result, the method is suitable for use by the general public. These objectives are achieved in the Geo-Stroke invention. The GEO-STROKE method condenses the strokes used in writing Chinese & Japanese ideographic character into ten (10) Geostroke types. Each of the ten (10) Geostrokes is assigned to a numeric digit (0–9) on the computer 10-key pad. Each Chinese & Japanese ideographic character is then uniquely identified by an eight (8)-digit Geo-Stroke code, comprised of a four (4)-digit "FRAME" code and a four (4)-digit "ID" code. By using this method every Chinese and Japanese ideographic character can be simply input and accurately retrieved by using a standard numeric 10-key pad. Both Chinese and Japanese users can now share one entry method to manipulate either languages, and be completely compatible and inter-changeable.

The present inputting method has the following features
1. Characters can be input and retrieved quickly and accurately in a way which maintains the tradition of the Chinese & Japanese Ideographic languages. (1–2 sec. per input)
2. Fewer strokes keys are used. And the rate of duplication is very low.

For Example: The Cheong-Chi entry system uses a combination of (242) radicals types represented by over 41 keys on the keyboard. The present invention uses only (10) basic stroke types, and can be input on a 10-key, making it much more user-friendly. In addition, both Chinese and Japanese languages can be controlled from the same 10-key with complete compatibility.
3. Using this entry method, users are not required to be skilled in the use of phonetics or Cheong-Chi. Geostroke input information is collected from the character graphically, the user only has to visualize what the character looks like to use the method.
4. The method is very easy to learn with the operation conforming to the thinking and responses of the Chinese & Japanese user. The method is suitable for users of various educational levels, ordinary users inexperienced in current character indexing techniques, and adults & children with limited formal training or educational backgrounds. An average of about 15 minutes of practice is sufficient to enable them to work on the computer inputting both Chinese and Japanese.

BRIEF DESCRIPTION OF THE DRAWINGS

FIG. 1 illustrates a numerical coding scheme for ideographic character strokes in accordance with the present invention.

FIG. 2 illustrates a sub-block coding scheme for single- and multi-block ideographic characters in accordance with the present invention.

FIG. 3 illustrates FRAME code segments of ideographic characters in accordance with the instant invention.

FIGS. 4–5 illustrate the FRAME and ID code segments of ideographic characters in accordance with the instant invention.

FIG. 7 exemplifies ideographic character stroke selection in accordance with the instant invention.

FIG. 8 illustrates two 10-key keypad designs in accordance with the instant invention.

FIGS. 9–10 illustrate an ideographic character processing and retrieving method in accordance with the instant invention.

FIG. 11 exemplifies the coding of traditional Chinese characters in accordance with the instant invention.

FIG. 12 exemplifies the coding of simplified Chinese characters in accordance with the instant invention.

FIG. 13 exemplifies the coding of Japanese Kata-Kana (KK) characters in accordance with the instant invention.

FIG. 14 illustrates a numerical coding scheme for Japanese Fira-Gana (FG) character strokes in accordance with the present invention.

DETAILED DESCRIPTION OF PREFERRED EMBODIMENTS

Figure 6:
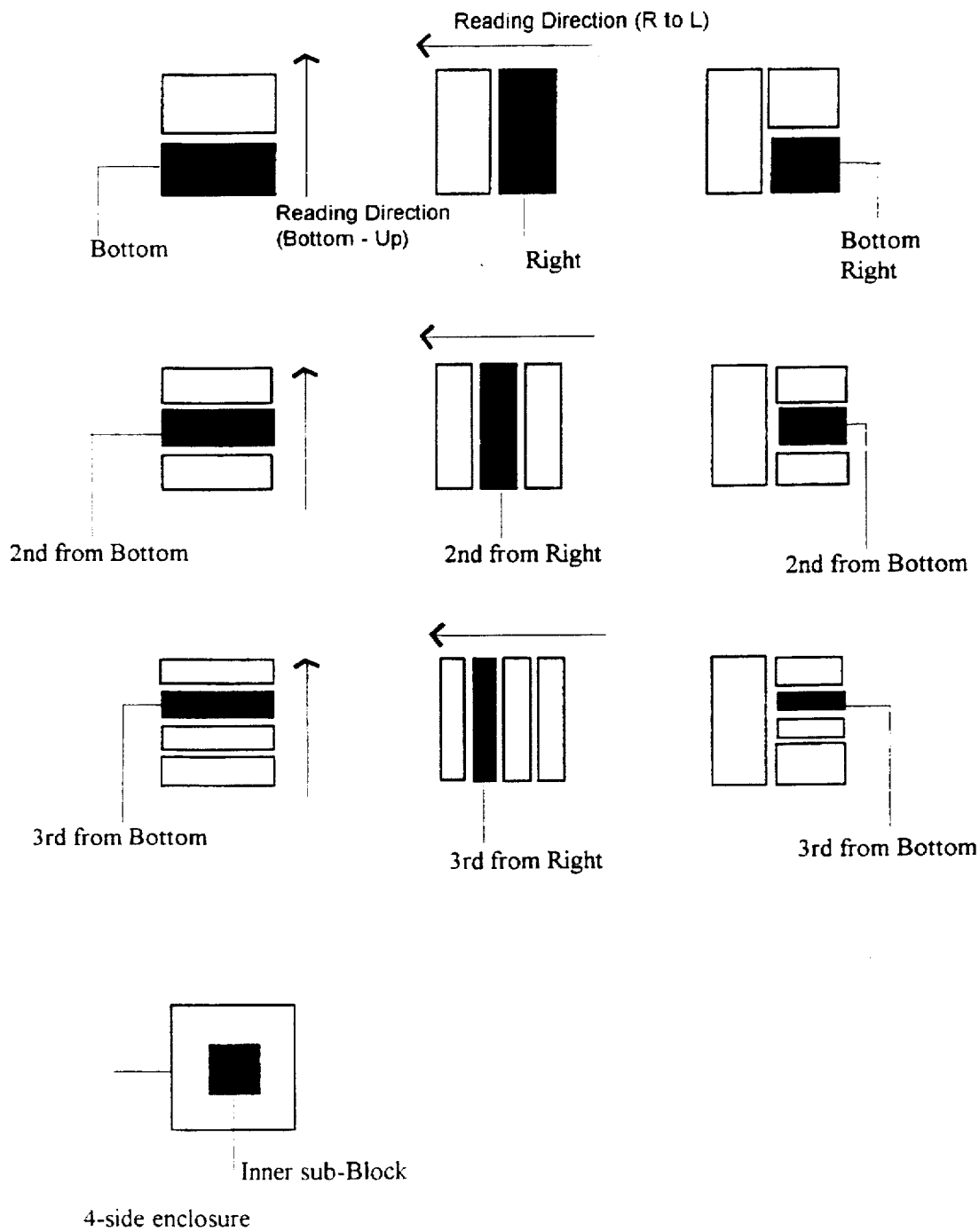
FIG. 6 exemplifies ideographic character sub-block selection in accordance with the instant invention.

This invention is a method for the encoding and input of Chinese & Japanese ideographic characters which are digitized into a numeric format compatible for machine access and retrieval. Each Chinese & Japanese character is indexed by a basic eight (8)-digit numeric Geo-stroke code.

The GEO-STROKE method combines the basic strokes used for inputting Chinese & Japanese ideographic characters into ten (10) Geo-Stroke types. Each of the ten (10) Geo-Strokes is assigned to a numeric digit (0–9) on the standard 10-key pad. Each stroke is categorized to closely resemble its numeric equivalent, special keyboard graphics are designed to integrate the geo-strokes into the numerals graphically, so it will be easy for the user to recognize. Each Chinese & Japanese ideographic character is then uniquely identified by an eight (8)-digit Geo-stroke code, comprised of (A) a four (4)-digit numeric "FRAME" code and (B) a four (4)-digit numeric "ID" code.

A. HOW TO SET THE "FRAME" CODE

Thousands of Chinese & Japanese ideographic characters are formed by using various basic strokes(s) and stroke combinations. These basic stroke groups are customarily taught to students learning to write Chinese & Japanese characters. For the purpose of this invention the number of stroke(s) have been categorized into ten (10) specific Geo-stroke types. Each Geo-stroke type is assigned to a numeric digit that graphically resembles each Geo-stroke.

FIG. 1 shows the Geo-stroke groups used for the input of characters. The numeric one (1) represents the top-down "Vertical" stroke, the numeric two (2) represents the left-to-right "Horizontal" stroke, the numeric three (3) represents the left-to-right "Dot" and left-to-right "Tick" strokes, the numeric four (4) represents the right-to-left "Downstroke", the numeric five (5) represents the left-to-right "Downstroke", the numeric six (6) represents the "Spoon" stroke (strokes with rounded angles), the numeric seven (7) represents the "Corner" & "Angle" strokes (stroke combinations that form corners & angles), the numeric eight (8) represents the "Cross" strokes (stroke combinations that form intersections), the numeric nine (9) represents the "Hook" strokes(strokes ending with a hook), and the numeric zero (0) represents the "Box" strokes.

According to the present invention, each ideographic character is considered to be a whole picture represented by two identification codes, an outer four(4)-digit "FRAME" code and an inner four (4)-digit "ID" code. The "FRAME" code is defined by reading the stroke formations at the four locations of the characters in the following sequence. Strokes are read in a "Z" pattern, starting with the TOP-LEFT, TOP-RIGHT, BOTTOM-LEFT EDGE and, BOTTOM-RIGHT EDGE. See FIG. 3 for examples.

B. HOW TO SET THE "ID" CODE

Ideographic words are written by using a combination of strokes and/or radicals. Chinese & Japanese characters are generally written in single-block character forms or multi-block character forms that resemble stacks of vertical, horizontal or a combination of both vertical and horizontal blocks. The Geo-Stroke method scientifically identifies and classifies these recurring character forms into six (6) categories of Geo-block types.

FIG. 2 shows a chart listing the Geo-Block types. Type one (1) represents single-block characters, Type two (2) Characters having 2 sub-blocks, Type three (3) Characters having 3 sub-blocks, Type four (4) Characters having 4 sub-blocks, Type five (5) Characters having five sub-blocks, Type (6+) Characters having 6 or more sub-blocks. Sample characters are also shown for each Geo-Block types.

Character are indexed to the Geo-Blocks by
1. Determine how many independent blocks or sub-blocks that make up each individual character. Characters are dissected into their sub-blocks by stroke/radical groups.
2. Index the character to the corresponding Geo-block type.
3. Use one of the sub-blocks within the Geo-block to determine the "ID" code. The black sub block in each Geo-block type represents the sub-block used for setting the "ID" code for those character types, this sub-block is named the "ID block".

The four (4)-digit "ID" code is determined by reading the stroke formation of the stroke and or radical group that is contained within the "ID Block". Stroke formations are read in a "Z" pattern, starting with the TOP-LEFT, TOP-RIGHT, BOTTOM-LEFT EDGE and, BOTTOM-RIGHT EDGE. See FIGS. 4 & 5 for examples Rules to follow when selecting the ID Block "ID" Blocks are generally defined by the following method:

Rule 1. In the simple two-block pattern: The ID block is located at the lower or on the right. See FIG. 6 for examples Rule 2. Characters with complex multi-horizontal and vertical block pattern: Count the sub blocks from the bottom-up and from right-to-left respectively. For example: When sub-blocks are in stacks of two, use the bottom sub-block, when in stacks of three use the middle sub-block, when in stacks of four use the third sub-block from bottom. See FIG. 6 for examples Rule 3. Single-block characters with four-side enclosed frame: Use the central portion. See FIG. 6 for examples Rule 4. If there are two competing sub-blocks, use the top-down, left-to-right reading rules. The upper-left, the lower-left or the dominant sub-block has the priority.

Priority Rules to follow when setting Geo-Stroke codes

Priority Rule 1 (Single Tops)

"Single Top" on a character will be counted twice for both the upper-left and the upper-right inputs.

See FIG. 7 for examples

Priority Rule 2 (Competing Strokes)

Stroke situated closest to the "lower-left edge" or the "lower-right edge" of a character is used.

See FIG. 7 for examples

Priority Rule 3 (One-Side Strokes)

A single stroke or stroke combination located on any one side of a character is used twice to represent both locations of each respective side. See FIG. 7 for examples Treatment for code Duplication When encoding the thousands of Chinese & Japanese ideographic characters, it is inevitable for duplicate character codes to occur. Therefore, the treatment for code duplication is to add two (2) additional digits to the basic eight (8)-digit Geostroke code on as-needed basis. The Geostroke method uses two (2) rules to prevent possible code duplications.

1. To add a 9th digit to identify the the number of horizontal, non-horizontal, or angle strokes that make up the character's "ID block".

2. A 10th digit to represent the total number of sub-blocks that make up the characters. If code duplication continues to persist, change the 10th digit to an alphabet index, such as a,b,c,d,e,f,g,h, etc.

By using these treatments for character duplications, the Geo-stroke method has been tested, and excellent input accuracy is achieved.

FIG. 8. A layout of the Geo-stroke 10-key-pad arrangements is shown. Special Geostroke Keyboard graphics are designed to visually simulate their numeric equivalents. Geostrokes are graphically superimposed against their numeric counterpart to enhance the ability for users to mentally transpose Geostrokes into numbers. The key pad arrangement for the present invention is constructed according to the general industry standards for computer 10-keys. Therefore, a substantial saving of cost can be obtained by not replacing existing systems & hardware. Both Chinese & Japanese versions can coexist on the same keypad with complete compatibility.

Figure 9:
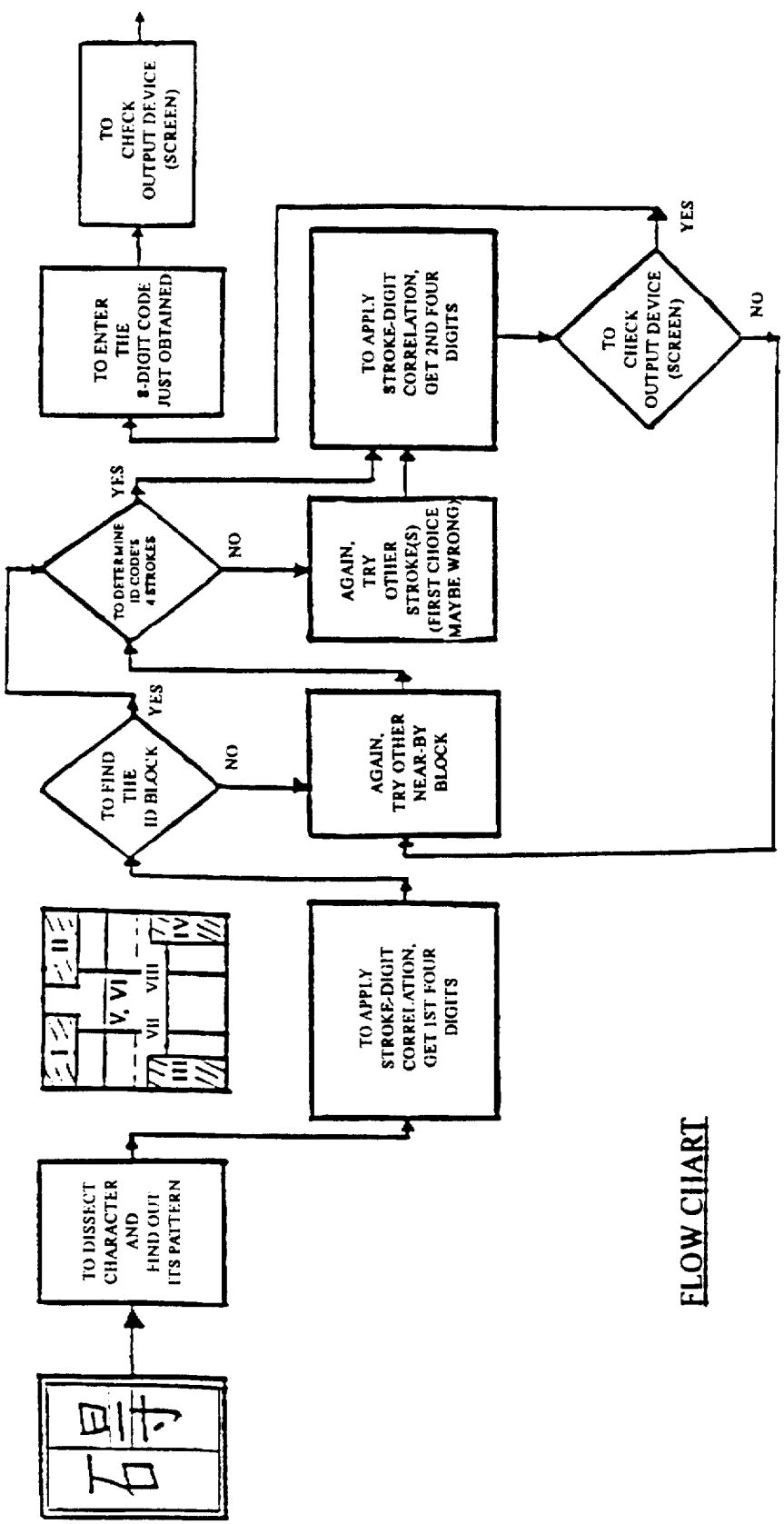

FIG. 9. Is a Flow Chart outlining the ideographic character processing and retrieving method according to the present invention.

FIG. 10. Shows application: of ideographic character coding in connection with traditional Chinese characters.

FIG. 11. Shows application of ideographic character coding in connection with simplified Chinese characters. Use same coding method for these characters.

FIG. 12. Shows application of ideographic character coding in connection with Japanese Kata-Kana (KK) characters. Japanese (KK) characters were originally derived from traditional Chinese characters, and do closely resemble their Chinese counterparts respectively. The same coding method will apply when coding these character types. Use the same Geo-strokes used for Chinese characters to set codes for these character types.

FIG. 13. Shows application of ideographic character coding in connection with Japanese Fira-Gana(FG) characters. Fira-Gana character set is only a "cursive" version of the above mentioned Kata-Kana characters. Use the same coding method when coding these character types. See FIG. 14 for Geo-Strokes used only for setting Fira-Gana character codes.

I claim:

1. A method of encoding Chinese and Japanese ideographic characters for computer entry, retrieval and processing, comprising the steps of:

a) categorizing the geometrical strokes utilized to form ideographic characters into ten stroke family types and assigning a distinct Arabic numeral, ranging between 0–9, to each of said ten stroke types, wherein each stroke is categorized to closely resemble it's assigned numeral;

b) reading the stroke formations at four strategic locations, the two upper corners and the two lower-side edges, on the periphery of a character in a "Z" sequence to obtain a four-digit FRAME code for the character;

c) identifying the block formation pattern of the character and selecting a particular block or sub-block thereof as an ID block, in accordance with a set of rules; and d) reading the stroke formations at four strategic locations, the two upper corners and the two lower-side edges, of the selected ID block of the character in a "Z" sequence to obtain a four-digit ID code therefore;

wherein each ideographic character is uniquely identified by an eight-digit Geo-Stroke code comprising a corresponding four-digit FRAME code and a corresponding four-digit ID code.

2. A method as claimed in claim 1, further wherein:

a vertical stroke is represented by the "1" numeral;

a horizontal stroke is represented by the "2" numeral;

left-to-right dot or tick strokes are represented by the "3" numeral;

right-to-left downstrokes are represented by the "4" numeral;

left-to-right downstrokes are represented by the "5" numeral;

spoon strokes are represented by the "6" numeral;

corner or angle strokes are represented by the "7" numeral;

crossing strokes are represented by the "8" numeral;

hook strokes are represented by the "9" numeral; and box strokes are represented by the "0" numeral.

3. A method as claimed in claim 1, further wherein:

the single stroke in a single top character will be counted twice, once for the upper-left corner stroke and once for the upper-right corner stroke;

when stroke competition occurs, the stroke closest to the lower-left edge or the lower-right edge of a character is utilized; and a single stroke or stroke combination located on any one side of a character is used twice to represent both locations of each respective side.

4. A method as claimed in claim 1, further wherein:

a ninth digit is provided in the Geo-Stroke code, to identify the number of horizontal, non-horizontal, or angle strokes that make up the character's ID block; and a tenth digit is provided in the Geo-Stroke code, to represent the total number of sub-blocks that make up the character.

5. A method as claimed in claim 1, further wherein:

said ID block is selected by counting the character's sub-blocks from the bottom up or from right to left, if several horizontal or vertical sub-blocks are stacked or in parallel;

selecting the bottom sub-block when two are in a stack;

selecting the right sub-block when two are in parallel;

selecting the center sub-block when three or an odd number are in a stack or in parallel;

selecting the sub-block above or to the left of the center of the character when four or an even number of sub-blocks are in a stack or in parallel; and selecting the central block portion as the ID block when the outside is a big block;

wherein when two sub-blocks compete for selection, apply the rule of selecting the upper first, left side first, lower-left first, or the most outstanding one first between the two competing sub-blocks.

* * * * *